(12) United States Patent
Shiojima

(10) Patent No.: US 8,533,046 B2
(45) Date of Patent: Sep. 10, 2013

(54) ADVERTISEMENT SERVER, USER TERMINAL, ADVERTISEMENT METHOD, AND ADVERTISEMENT VIEWING PROGRAM

(75) Inventor: Tetsuya Shiojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 12/593,547

(22) PCT Filed: Mar. 26, 2008

(86) PCT No.: PCT/JP2008/055662
§ 371 (c)(1),
(2), (4) Date: Sep. 28, 2009

(87) PCT Pub. No.: WO2008/120624
PCT Pub. Date: Oct. 9, 2008

(65) Prior Publication Data
US 2010/0121715 A1  May 13, 2010

(30) Foreign Application Priority Data
Mar. 29, 2007  (JP) .................................. 2007-086356

(51) Int. Cl.
*G06Q 30/00*  (2012.01)
(52) U.S. Cl.
USPC ..................................................... 705/14.55
(58) Field of Classification Search
USPC .......................................................... 705/14
See application file for complete search history.

(56) References Cited

U.S. PATENT DOCUMENTS

| 6,226,744 | B1 | 5/2001 | Murphy et al. |
| 2001/0023892 | A1* | 9/2001 | Hendrick ....................... 235/380 |
| 2001/0039583 | A1* | 11/2001 | Nobakht et al. ............... 709/227 |
| 2004/0234047 | A1* | 11/2004 | Ciccarelli et al. ........... 379/88.16 |
| 2005/0177420 | A1* | 8/2005 | Tanahashi ........................ 705/14 |
| 2006/0076403 | A1* | 4/2006 | Namekawa et al. ........... 235/380 |
| 2008/0183568 | A1* | 7/2008 | Ida et al. .......................... 705/14 |

(Continued)

FOREIGN PATENT DOCUMENTS

| JP | 2003-163949 | 6/2003 |
| JP | 2005-115455 | 4/2005 |

(Continued)

OTHER PUBLICATIONS

International Search Report dated May 20, 2008, for corresponding Patent Application PCT/JP2008/055662.

(Continued)

*Primary Examiner* — Matthew L Hamilton
(74) *Attorney, Agent, or Firm* — K&L Gates LLP

(57) ABSTRACT

When a user accesses an advertisement site by a browser unit and requests transmission of the advertisement moving image, an advertisement server requests the user to connect an electronic money card to a reader/writer. The advertisement server can communicate with the electronic money card via the browser unit. Thus, the advertisement server reads an electronic money functional unit ID which is ID information of the electronic money card from the electronic money card to store it therein, and further transmits to the user terminal moving image data of the advertisement moving image stored in the advertisement moving image database. While the user terminal is reproducing the advertisement moving image, the advertisement server accesses the electronic money card through the browser unit for every given interval, and confirms that the electronic money card is connected to the reader/writer.

7 Claims, 11 Drawing Sheets

(56) References Cited

U.S. PATENT DOCUMENTS

| | | | |
|---|---|---|---|
| 2009/0036110 A1* | 2/2009 | Naito et al. | 455/418 |
| 2010/0042493 A1* | 2/2010 | Nino et al. | 705/14.45 |
| 2012/0124608 A1* | 5/2012 | Postrel | 725/23 |
| 2012/0323693 A1 | 12/2012 | Maekawa et al. | |

FOREIGN PATENT DOCUMENTS

| | | |
|---|---|---|
| JP | 2005-286882 | 10/2005 |
| JP | 2007-004489 | 1/2007 |
| JP | 2007-041918 | 2/2007 |
| JP | 2009276932 A1 * | 5/2008 |
| WO | 00/79411 | 12/2000 |
| WO | 02/071285 | 9/2002 |
| WO | 2004/053755 | 6/2004 |
| WO | 2006/137285 | 12/2006 |

OTHER PUBLICATIONS

EP Search Report corresponding to 08738886.4 dated May 12, 2011; 3 pages.

Statement in accordance with the Notice from the European Patent Office dated Oct. 1, 2007 concerning business methods (OJ EPO Nov. 2007, 592-593); 1 page.

European Patent Office, Summons to attend oral proceedings pursuant to Rule 115(1) EPC issued in connection with European Patent Application No. 08738886.4, dated Jul. 26, 2012. (7 pages).

PCT International Preliminary Report on Patentability issued on Oct. 20, 2009 for corresponding International application No. PCT/JP2008/055662.

* cited by examiner

FIG. 8

(a) USER DB

| ELECTRONIC MONEY FUNCTIONAL UNIT ID | NAME | SEX | AGE | ADDRESS | HOBBY | ... |
|---|---|---|---|---|---|---|
| 123456 | SUZUKI TARO | MALE | 2 8 | TOKYO... | CAR | ... |
| ... | ... | ... | ... | ... | ... | ... |

(b) ADVERTISEMENT MOVING IMAGE DB

| ADVERTISEMENT ID | MOVING IMAGE DATA | ADVERTISER ID | ... |
|---|---|---|---|
| C0301 | kuruma.abc | 0 0 3 | ... |
| ... | ... | ... | ... |

(c) VIEW RECORD DB

| VIEW ID | ELECTRONIC MONEY FUNCTIONAL UNIT ID | ADVERTISEMENT ID | VIEW DATE | VIEW CONFIRMATION RESULT | ... |
|---|---|---|---|---|---|
| SC568 | 123456 | C0301 | 2007.3.2 | ALL VIEW | ... |
| ... | ... | ... | ... | ... | ... |

ADVERTISEMENT SERVER, USER TERMINAL, ADVERTISEMENT METHOD, AND ADVERTISEMENT VIEWING PROGRAM

CROSS REFERENCE TO RELATED APPLICATIONS

The present application is a National Stage of International Application No. PCT/JP2008/055662 filed on Mar. 26, 2008 and which claims priority to Japanese Patent Application No. 2007-086356 filed on Mar. 29, 2007, the entire contents of which are being incorporated herein by reference.

BACKGROUND

The present disclosure relates to an advertisement server, a user terminal, an advertisement method, and an advertisement viewing program, and relates to, for example, what distributes an advertisement moving image to a user terminal.

An advertising activity is one of the most important activities to a person who performs commercial activities, and how to advertise products of one's own company to consumers greatly affects the sales of the products.

Although advertisements which appeal images of the product of one's own company to the consumers for a very short time, like TV commercials and the like, for example, has been widely used, an advertisement called a so-called infomercial in which the product is explained in detail for a long time over, for example, 3 minutes to let the consumers understand the contents of the product has also been increased in number in recent years.

In addition, advertisement media that use IT (Information Technology) technologies which have been remarkably developed in recent years has also come to be used other than conventional televisions, radios, magazines, newspapers, and the like.

Using the IT technologies makes it possible to distribute advertisement moving images through the Internet, thus allowing the infomercial to be provided at extremely low cost as compared with the TV commercials or the like.

As the technology of thus distributing the advertisement moving image using the Internet, there is a technology described in following Patent Document 1 "SYSTEM AND METHOD OF DISTRIBUTING/CREATING ADVERTISEMENT MOVING IMAGE."

Patent Citation 1: Japanese Patent Application Laid-open No. 2005-286882

This technology quickly provides information on a product in which the user has got interested during reproduction of the advertisement moving image.

Conventionally, however, it has not been able to confirm that the user has been watching the advertisement moving image. Meanwhile, now that the user spends a considerable time to watch the advertisement moving image, there is also a request that the user wants to get some compensations (so-called extra income).

Therefore, it is desired to increase advertising effectiveness of the advertisement moving image by utilizing the IT technologies.

SUMMARY

In order to achieve the object, in an embodiment, an advertisement server is provided for transmitting an advertisement image to a user terminal connectable to an IC chip to which ID information is given, the advertisement server, comprising: transmission request accepting means for accepting a transmission request of the advertisement image from the user terminal; ID information receiving means for receiving from the user terminal ID information of an IC chip connected to the user terminal; transmission means for transmitting to the user terminal an advertisement image whose transmission request is accepted; and storage means for storing association between the transmitted advertisement image and the received ID information.

In an embodiment, the advertisement server, comprises connection confirming means for confirming that the IC chip is connected to the user terminal during reproduction of the advertisement image at the user terminal, wherein the storage means stores a confirmation result by the connection confirming means while further associating it with the stored association.

In an embodiment, the advertisement server, comprises ID information request means for requesting the ID information to the IC chip via the user terminal, wherein the connection confirming means requests transmission of the ID information to the IC chip by the ID information request means while the user terminal is reproducing the advertisement image, and confirms that the IC chip transmits the same ID information as the ID information received by the ID information receiving means in response to the request to thereby confirm that the IC chip is connected to the user terminal.

In an embodiment, the user terminal is provided with monitor means for monitoring that the IC chip is connected thereto during reproducing the advertisement image, and the connection confirming means confirms that the IC chip is connected to the user terminal during the reproduction of the advertisement image by receiving from the user terminal a monitored result obtained by the monitor means.

In an embodiment, the advertisement server, comprises instruction means for giving to the user a connection instruction to connect the IC chip to the user terminal, and a release instruction to release the connection, and connection/release confirming means for confirming that the IC chip is connected and released in response to the connection instruction and the release instruction, wherein the storage means stores a confirmation result by the connection/release confirming means while further associating it with the stored association.

In an embodiment, there is provided a user terminal, comprising: IC chip connecting means for connecting to an IC chip to which ID information is given; transmission request means for requesting transmission of an advertisement image to an advertisement server that distributes the advertisement image; ID information transmitting means for acquiring the ID information from the connected IC chip to transmit it to the advertisement server; advertisement image receiving means for receiving the requested advertisement image; reproduction means for reproducing the received advertisement image; and supporting means for supporting the advertisement server to confirm that the IC chip is connected by the IC chip connecting means during the reproduction of the advertisement image.

In an embodiment, there is provided the user terminal according to claim 6, wherein the supporting means connects the advertisement server and the IC chip during the reproduction of the advertisement image.

In an embodiment, there is provided the user terminal according to claim 6, comprising monitor means for monitoring that the IC chip is connected during reproducing the advertisement image, wherein the supporting means transmits to the advertisement server a monitored result by the monitor means.

In an embodiment, there is provided an advertisement method performed by an advertisement server that transmits an advertisement image to a user terminal connectable to an IC chip to which ID information is given, wherein the advertisement server, transmission request receiving means, ID information receiving means, transmission means, and storage means are provided, the advertisement method, comprising: a transmission request accepting step of accepting a transmission request of the advertisement image from the user terminal, by the transmission request receiving means; an ID information receiving step of receiving from the user terminal ID information of an IC chip connected to the user terminal, by the ID information receiving means; a transmission step of transmitting to the user terminal an advertisement image whose transmission request is accepted, by the transmission means; and a storage step of storing association between the transmitted advertisement image and the received ID information, by the storage means.

In an embodiment, there is provided an advertisement viewing program for causing the computer to achieve: an IC chip connecting function of connecting to an IC chip to which ID information is given; a transmission request function of requesting transmission of an advertisement image to an advertisement server that distributes the advertisement image; an ID information transmitting function of acquiring the ID information from the connected IC chip to transmit it to the advertisement server; an advertisement image receiving function of receiving the requested advertisement image; a reproduce function of reproducing the received advertisement image; and a support function for supporting the advertisement server to confirm that the IC chip is connected by the IC chip connecting function during the reproduction the advertisement image.

According to the embodiments, the advertising effectiveness of the advertisement moving image can be increased by associating the IC chip that the user owns with the reproduction of the advertisement moving image.

Additional features and advantages are described herein, and will be apparent from, the following Detailed Description and the figures.

BRIEF DESCRIPTION OF THE FIGURES

FIG. 8 is a view for explaining various databases;

DETAILED DESCRIPTION (1) Outline of Embodiment

Figure 1:
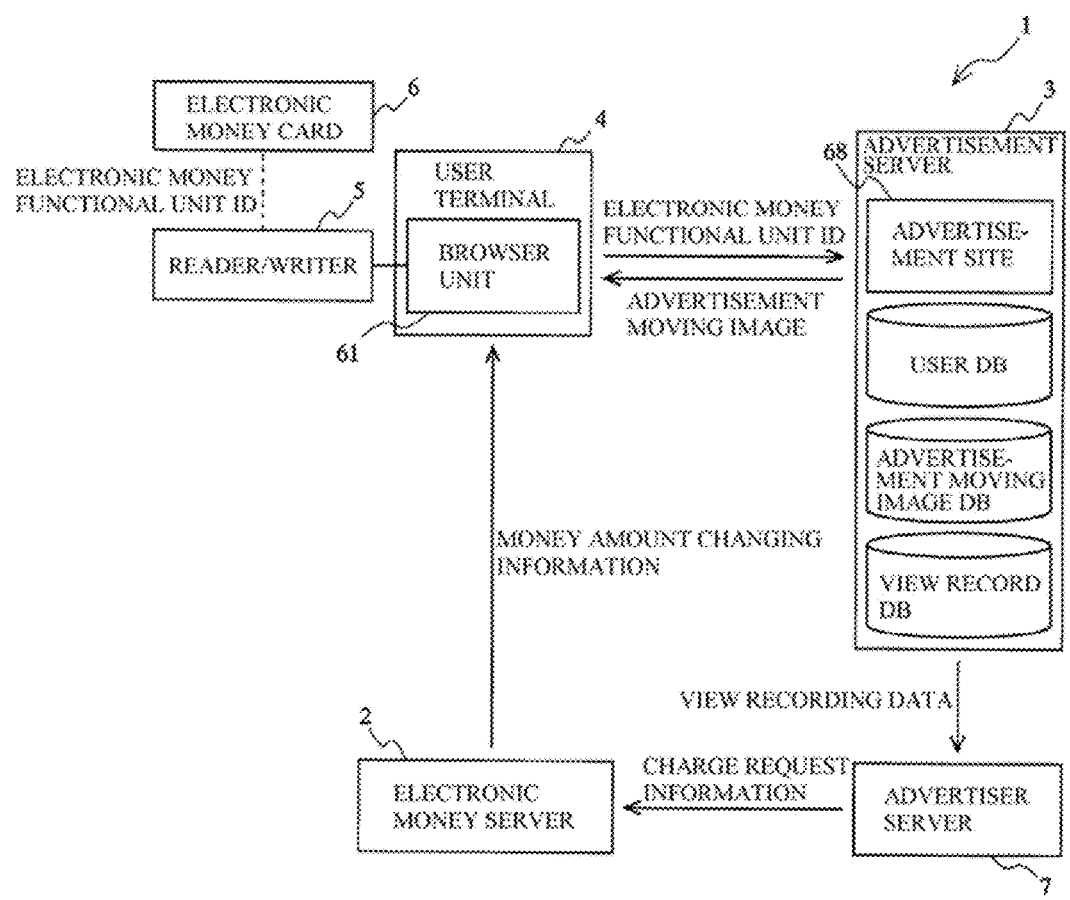
FIG. 1 is a view illustrating a configuration of an advertisement system of the present embodiment.

When a user accesses an advertisement site 68 through a browser unit 61 (FIG. 1) to request transmission of an advertisement moving image, an advertisement server 3 requests the user to connect an electronic money card 6 to a reader/writer 5.

A function to access the electronic money card 6 through the reader/writer 5 is incorporated in the browser unit 61, and the advertisement server 3 can communicate with the electronic money card 6 through the browser unit 61 when the electronic money card 6 is connected to the reader/writer 5.

In this way, the advertisement server 3 reads from the electronic money card 6 an electronic money functional unit ID which is ID information of the electronic money card 6 to then store it, and further transmits to a user terminal 4 moving image data of the advertisement moving image stored in an advertisement moving image database.

The advertisement server 3 accesses the electronic money card 6 through the browser unit 61 for every given interval while the user terminal 4 is reproducing the advertisement moving image, and confirms that the electronic money card 6 is connected to the reader/writer 5:

The advertisement server 3 confirms that the user is viewing the advertisement moving image by confirming that the reader/writer 5 is connected to the electronic money card 6.

It is to be noted that the access to the electronic money card 6 may be performed at irregular intervals. In this case, it may be configured so as to have given regularity, such that the access interval may be reduced as the distribution of the advertisement moving image approaches the end.

When the reproduction of the advertisement moving image is completed at the user terminal 4, the advertisement server 3 generates view recording data composed of the electronic money functional unit ID of the electronic money card 6, an advertisement ID of the advertisement moving image, a view confirmation result by the connection between the electronic money card 6 and the reader/writer 5, and the like, and stores it in a view recording database.

Subsequently, the advertisement server 3 transmits to an advertiser server 7 the view recording data accumulated in the view recording database for every given period.

Upon receiving the view recording data from the advertisement server 3, the advertiser server 7 calculates an amount of money that the advertiser has to pay to the user as compensation of the view with respect to the view recording data whose view of the advertisement moving image is confirmed by the user, based on the view confirmation result.

Subsequently, the advertiser server 7 sends to the electronic money server 2 the electronic money functional unit ID and the amount of money to be paid while associating them with each other, and requests a charge of the amount of money, to be paid to the electronic money card 6.

Upon receiving the request of the charge from the advertiser server 7, the electronic money server 2 transmits money amount changing information for charging the amount of money to be paid, to the electronic money card 6 through the user terminal 4 and the reader/writer 5.

The electronic money card 6 executes this money amount changing information, and charges the amount of money to be paid.

(2) Details of Embodiment

FIG. 1 is a view illustrating a configuration of an advertisement system of the present embodiment.

An advertisement system 1 is constituted by the user terminal 4, the reader/writer 5, the electronic money card 6, the electronic money server 2, the advertisement server 3, and the advertiser server 7.

The electronic money card 6 is an IC card in which a noncontact IC chip is incorporated, and it stores electronic data representing a monetary value called a value, thus allowing the monetary value to be moved by increasing/decreasing an amount of money of the value.

Although not illustrated, the electronic money card 6 is connected to an electronic money terminal set in a shop or the like through short-distance wireless communication, and payment can be settled by reducing from the electronic money card 6 the value for the amount of money instructed by the electronic money terminal.

A unique electronic money functional unit ID is given to the noncontact IC chip, thereby allowing the electronic money card 6 to be specified in the advertisement system 1. As described above, the noncontact IC chip functions as an IC chip to which the ID information is given. It is to be noted that the present embodiment will be described using the noncontact IC chip, but a contact IC chip may be used for it.

It is to be noted that processing of increasing the amount of money stored in the electronic money card 6 will be called a charge, whereas processing of reducing it therefrom will be called a settlement.

The reader/writer 5 is a device for providing an interface between the electronic money card 6 and the user terminal 4 when they perform communications with each other, and it is incorporated inside the user terminal 4 upon manufacturing the user terminal 4.

The reader/writer 5 incorporates an antenna and connects to the electronic money card 6 through short-distance wireless communication.

As a specific form of use, the electronic money card 6 is set in the reader/writer 5 by putting the electronic money card 6 on a surface of a portion where the reader/writer 5 is set.

Although a case where the electronic money card 6 is incorporated in the user terminal 4 will be mainly described in the present embodiment, the reader/writer 5 may be attached to the user terminal 4 from the outside as a peripheral device.

The user terminal 4 is constituted by, for example, a personal computer, and it is connectable to the advertisement server 3 and the electronic money server 2 via a network, such as the Internet or the like.

The user terminal 4 incorporates a browser program therein, and the browser program is executed by a CPU to thereby form the browser unit 61.

The browser unit 61 has a function of accessing each website on the network, and also incorporates therein a function of connecting to the electronic money card 6 via the reader/writer 5.

As will be hereinbelow described, since the browser unit 61 provides a function for the user to access the advertisement site 68 to view the advertisement moving image, thus operating as an advertisement viewing program.

Incidentally, game machines, televisions, and set top boxes connectable to the network, personal digital assistants such as a mobile phone or the like, household appliances, and the like may be used as the user terminal 4.

In addition, the user terminal 4 may not only be individually used by the user at home or as a mobile terminal, but also be in a form of being set in a commercial establishment such as a supermarket or the like.

In this case, it is constituted such that the user terminal 4 is set in an entrance of the commercial establishment, and the user connects the electronic money card 6 to the reader/writer 5 to be able to view the advertisement moving image, for example.

Further, for example, when a demonstration sale of foods is desired to be performed, the user terminal 4 may be set in a foods counter to view a recipe of foods by the advertisement moving image.

In this case, a plurality of readers/writers 5 are provided in the user terminal 4, and a demonstration sale member keeps the electronic money cards 6 from a plurality of users to set them in the readers/writers 5, thus allowing the plurality of users to view it at one time.

The browser unit 61 is a function unit for accessing various websites on a network, and it can accept from the user an input of connection information (URL (Uniform Resource Locators)) to the advertisement site 68, to connect the user terminal 4 to the advertisement site 68, and also can accept an input of connection information to the service site of the electronic money server 2 to connect the user terminal 4 to the electronic money server 2.

In addition, the browser unit 61 is provided with a link function with the moving image reproduction program, or an accessing function to the electronic money card 6, and it can reproduce the advertisement moving image, or interface the communication between the advertisement server 3 and the electronic money card 6.

The advertisement server 3 is a server device that provides the user terminal 4 with the advertisement moving image provided by the advertiser.

The advertisement server 3 manages the advertisement site 68, and it is also provided with a user database, an advertisement moving image database, and a view recording database.

The advertisement site 68 provides an advertisement selecting screen and the like at the user terminal 4.

On the advertisement selecting screen, a list of the advertisement moving images provided by the advertiser is displayed by genre, for example, "car", "health". "travel", and the like, and the user can select a desired genre. Moreover, endorsement advertising from the advertiser may be selected.

For more details, in a car genre, advertisement moving image buttons by car-relevant advertisers are selectably displayed, such that "if you want free car-appraisal, it is OO used car", "if you want to buy new car, it is OO auto", and the like, while in a healthy genre, advertisement moving image buttons by health-relevant advertisers are selectably displayed, such that "if you want to remove fat, it is OO exercise machine", "if you want to take supply of vitamin, it is OO tablet", and the like.

When the user selects any advertisement moving image on the advertisement selecting screen, the advertisement server 3 performs streaming distribution of the moving image data to the user terminal 4.

The user database stores the electronic money functional unit ID of the electronic money card 6 that the users own, and user's attributes, such as age, sex, or the like, while associating them with each other.

When the electronic money functional unit ID is transmitted from the user terminal 4, the advertisement server 3 can search this in the user database to specify the user. In addition, once the user can be specified, it can also provide the advertisement moving image according to the user's attribute.

The advertisement moving image database stores the moving image data of the advertisement moving image provided by the advertiser.

It is to be noted that the advertisement moving image is transmitted by streaming in the present embodiment, but it is not limited to this, and it may be constituted such that after the user terminal 4 downloads all the advertisement moving images, the user terminal 4 reproduces the images.

The view recording database stores a view history of the advertisement moving image viewed by the user.

The advertisement server 3 records on the view recording database the electronic money functional unit ID received from the user terminal 4, and the advertisement ID of the advertisement moving image transmitted to the user terminal 4, while associating them with each other.

In addition, in order to confirm whether or not the user is viewing the advertisement moving image, the advertisement server 3 polls the electronic money card 6 for every given interval (for example, for every 10 seconds, or it may be irregular), and also stores the result while further associating it with an association between the above-described electronic money functional unit ID and advertisement ID.

Subsequently, the advertisement server 3 periodically transmits the view recording data thus accumulated in the view recording database to the advertiser server 7 of the advertiser that has provided the advertisement moving image.

The advertiser server 7 is a server device of the advertiser that has provided the advertisement server 3 with the advertisement moving image. Although only one server is illustrated in the figure, a plurality of advertiser servers 7 also exist when there are a plurality of advertisers.

A payment standard, such that "if the advertisement moving image is viewed from the beginning to the end, 10 yen will be paid to the user, but if it is partially viewed, payment will not be performed", or the like are stored in the advertiser server 7.

Upon receiving the view recording data from the advertisement server 3, the advertiser server 7 will analyze this to confirm whether or not it satisfies the advertisement moving image viewed by the user and the payment standard.

Subsequently, it sums the amount of money to be paid for every user based on the payment standard to transmit this to the electronic money server 2 as charge request information.

The electronic money server 2 is a server device that provides various services and performs information processing concerning the electronic money card 6.

The electronic money server 2 establishes a service site which is a website for performing the charge to the electronic money card 6 and also providing various services.

Subsequently, the electronic money server 2 receives the charge request information from the advertiser server 7, and charges the amount of money to be paid from the service site to the electronic money card 6 based on this.

For more details, the user inputs the connection information of the service site into the browser unit 61 to connect the user terminal 4 to the electronic money server 2, and connects the electronic money card 6 to the reader/writer 5 according to instructions of the service site, such that "You can charge 100 yen by the reward of the advertisement view. Please connect the electronic money card 6 to the reader/writer 5."

Subsequently, when the payment button on the service site is clicked and the charge of the amount of money to be paid is requested, the electronic money server 2 will generate the money amount changing information for increasing the value for the amount of money to be paid to transmit it to the electronic money card 6.

The electronic money card 6 performs the charge using this money amount changing information, thereby allowing the user to receive the reward.

As described above, the advertisement server 3 distributes the advertisement moving image to the user terminal 4, and thereby the user can view the advertisement moving image, in the advertisement system 1.

The advertisement server 3 can confirm that the user is viewing the advertisement moving image by confirming whether or not the electronic money card 6 is connected to the reader/writer 5 while the advertisement moving image is reproduced at the user terminal 4.

Meanwhile, when the use views the advertisement moving image, the reward is paid to the user from the advertiser and the user can charge it to the electronic money card 6.

It is to be noted that while a case where the advertisement server 3 distributes the advertisement moving image is described in the present embodiment, this does not limit the advertisement to a moving picture, but it may be constituted so as to distribute an advertising still image based on a still picture, for example.

In this case, it may be constituted so as to continue displaying the same advertising still image, or it may be constituted so as to switch the advertising static image at every fixed time interval like a slide show or at an irregular interval, for example.

Even when the advertising still image is distributed, the advertisement server 3 polls the electronic money card 6 at every given interval (for example, 10 seconds) in order to confirm whether or not the user is viewing the advertising still image, and also stores the result while further associating it with an association between the above-described electronic money functional unit ID and advertisement ID.

It is to be noted that the access to the electronic money card 6 may be performed at irregular intervals. In this case, it may be configured so as to have given regularity, such that the access interval is reduced as the distribution of the advertisement still image approaches the end.

Figure 2:
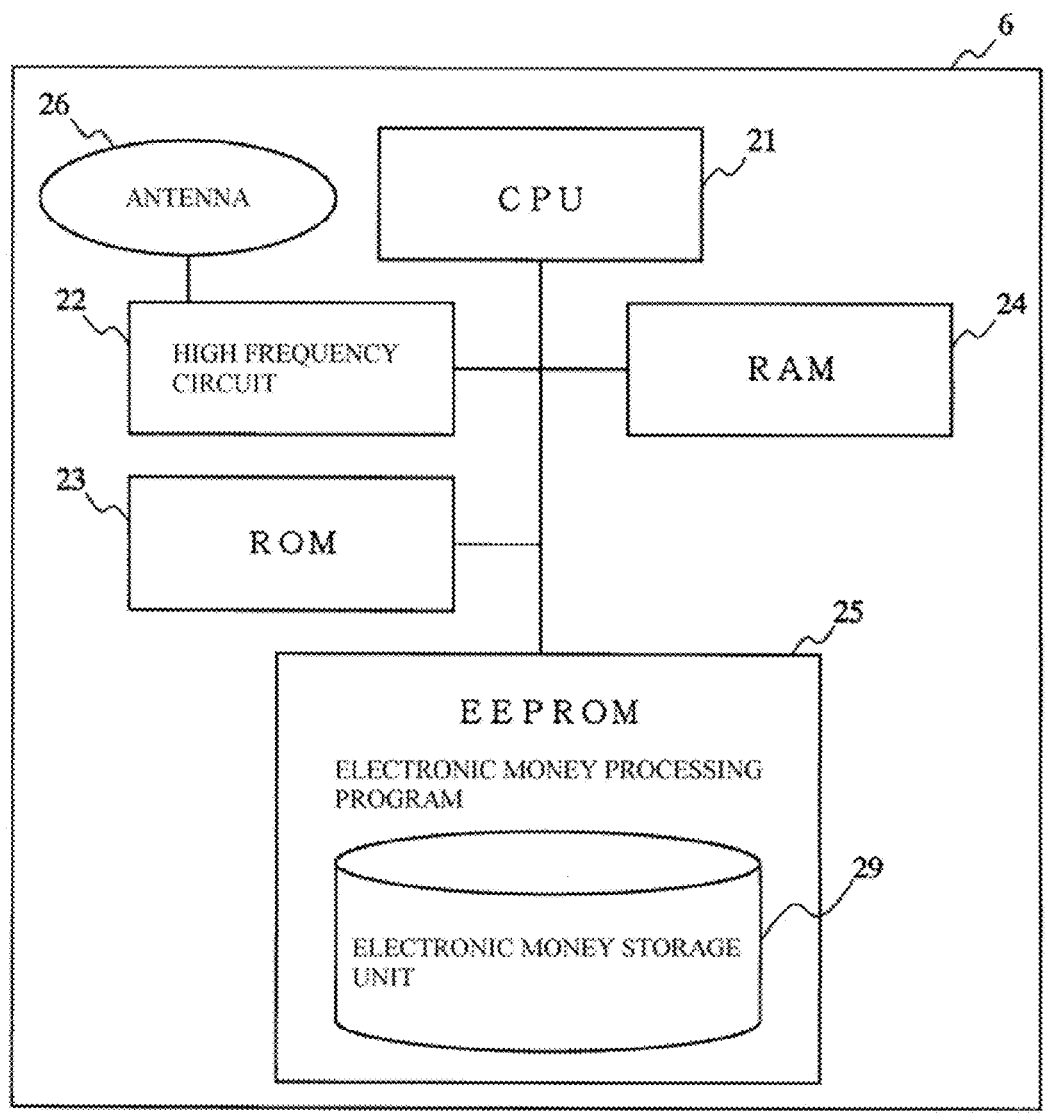
FIG. 2 is a block diagram illustrating one example of a hardware configuration of an electronic money card.

FIG. 2 is a block diagram illustrating one example of a hardware configuration of an electronic money card 6.

The electronic money card 6 has a CPU (Central Processing Unit) 21, a high frequency circuit 22, an antenna 26, a ROM (Read Only Memory) 23, a RAM (Random Access Memory) 24, an EEPROM (Electronically Erasable and Programmable ROM) 25, and the like.

These devices are formed on the IC chip and this IC chip functions as a monetary terminal in which a balance (value balance) of the monetary value (value) is stored.

Meanwhile, the antenna 26 is constituted by an antenna which is spread around near the outer edge portion inside the electronic money card 6, or on an elliptic curve around a diagonal line of the electronic money card 6, and an end thereof is connected to the IC chip.

The CPU 21 is a central processing unit for processing information according to various programs stored in the ROM 23 or the EEPROM 25, and performs money amount changing processing of changing the stored amount of money of the value balance, such as the settlement processing, the charge, and the like.

The CPU 21 can perform short-distance wireless communication with the reader/writer 5 via the antenna 26 and the high frequency circuit 22.

The antenna 26 is an antenna for performing transmission and reception by the antenna incorporated in the reader/writer 5 of the user terminal 4, and electric waves, wherein it not only transmits and receives a variety of information but also generates electric power for driving the IC chip by the electric waves from the reader/writer 5.

The high frequency circuit 22 converts into digital signals the high-frequency waves transmitted to the antenna 26 from the reader/writer 5 to output them to the CPU 21, and conversely, converts into the high-frequency waves the digital signals outputted by the CPU 21 to forward them to the reader/writer 5 from the antenna 26.

The RAM 24 is a randomly writable/readable memory, which provides a working memory when the CPU 21 processes information.

In the present embodiment, it is used as a temporary storage area when the CPU 21 transmits the electronic money functional unit ID to the user terminal 4 or performs the money amount changing processing.

The ROM 23 is a read-only memory for storing a fundamental program, parameters, data, and the like for operating the electronic money card 6.

The EEPROM 25 is a ROM, which can write/erase information. The information stored in the EEPROM 25 is maintained even when there is no electric power supply to the electronic money card 6.

In the EEPROM 25, an electronic money processing program for making the electronic money card 6 fulfill functions as the electronic money card is stored, and an electronic money storage unit 29 for storing various data, such as the electronic money functional unit ID, the value balance, the log data, and the like is also formed.

Figure 3:
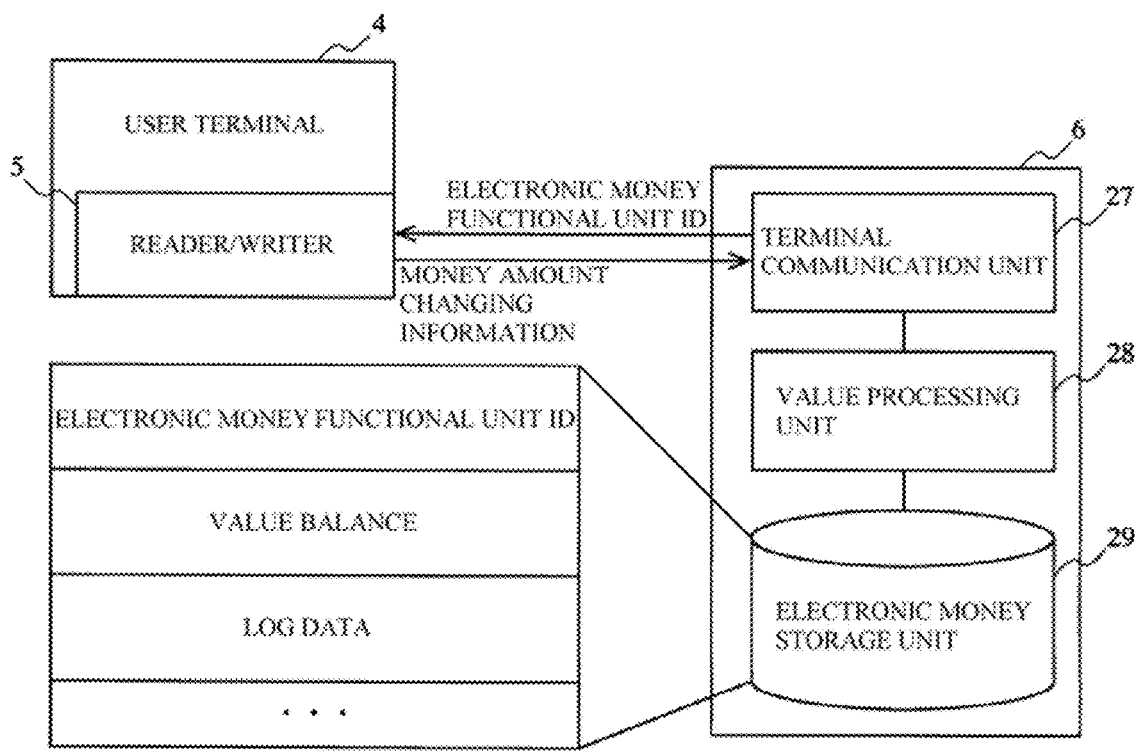
FIG. 3 is a block diagram diagrammatically illustrating a functional configuration of the electronic money card.

FIG. 3 is a block diagram diagrammatically illustrating a functional configuration of the electronic money card 6 formed when the electronic money processing program is executed by the CPU 21.

The electronic money functional unit ID, the value balance, the log data, and the like are stored in the electronic money storage unit 29 formed in the EEPROM 25.

The value balance is a balance of the value stored currently, and the electronic money card 6 can perform the settlement processing by reducing this value balance by the electronic money terminal or the like set in the shop.

As described above, the electronic money storage unit 29 functions as money amount storage means for storing the amount of money of the monetary value as the electronic data (value).

The log data is log data on which value processing content and the like are recorded, and is composed of the processing date, hour, minute, and second, the charge amount, the settlement amount, and the like.

The terminal communication unit 27 is constituted by using the antenna 26, the high frequency circuit 22, and the like, and it interfaces the communication between the user terminal 4 and value processing unit 28, such as receiving an after-mentioned ID reference command, the money amount changing information, and other commands from the reader/writer 5 of the user terminal 4, and inputting them into the value processing unit 28.

The value processing unit 28 is an information processing unit for executing various commands.

The command includes the money amount changing information, the ID reference command, a balance reference command, and the like.

The money amount changing information is a command for causing the value processing unit 28 to perform the money amount changing processing.

The value processing unit 28 increases and decreases the value balance by the amount of money specified by the money amount changing information upon executing the money amount changing processing.

The ID reference command is a command for causing the value processing unit 28 to read the electronic money functional unit ID, and the value processing unit 28 reads the electronic money functional unit ID from the electronic money storage unit 29 and outputs it when the ID reference command is inputted.

The balance reference command is a command for causing the value processing unit 28 to read the value balance, and the value processing unit 28 reads the value balance from the electronic money storage unit 29 and outputs it, when the balance reference command is inputted.

While the configuration of the electronic money card 6 has been described as above, a mobile phone and other personal digital assistants in which an IC chip similar to the IC chip incorporated into the electronic money card 6 is mounted are also used widely in general.

Figure 4:
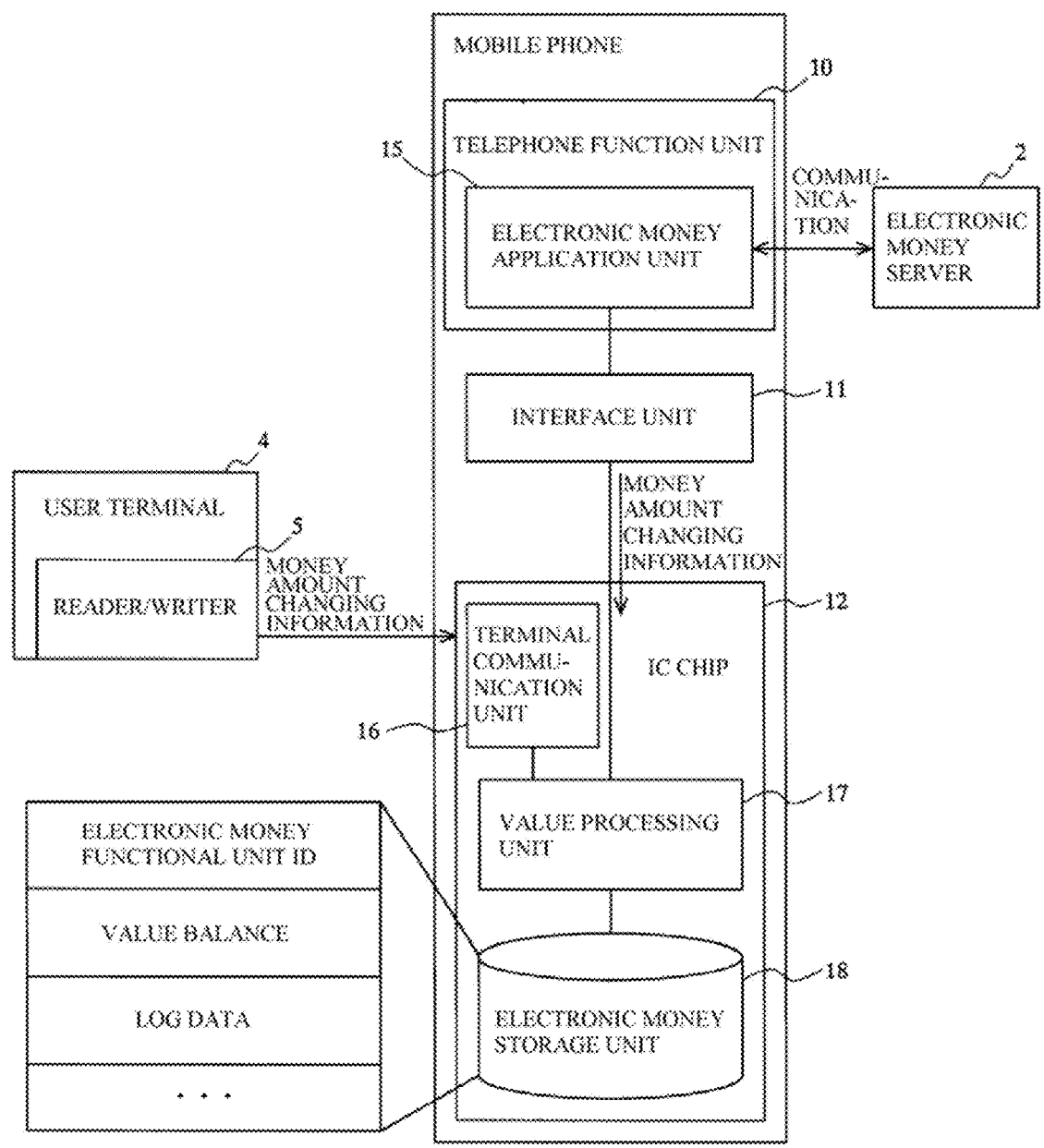
FIG. 4 is a conceptual diagram illustrating one example of a configuration of a mobile phone incorporating an IC chip.

FIG. 4 is a conceptual diagram illustrating one example of a configuration of the mobile phone incorporating the IC chip.

The mobile phone is provided with a telephone function unit 10 and an IC chip 12, which are connected through an interface unit 11.

The IC chip 12 has a function similar to that of the IC chip incorporated into the electronic money card 6, and it has functions to output the electronic money functional unit ID, to perform the money amount changing processing, and the like.

The telephone function unit 10 has a talk mode to talk over the telephone and an application mode, which can be switched by the user's operation.

The telephone function unit 10 is provided with a CPU and a storage unit in which various application programs are stored, and causing the CPU to execute the various application programs in the application mode allows it to achieve various application functions.

The electronic money application unit 15 is formed by executing an electronic money application program by the CPU of the telephone function unit 10.

The electronic money application unit 15 can access both the electronic money server 2 and the IC chip 12, and can interface communication between the electronic money server 2 and the IC chip 12.

The IC chip 12 is connected to the electronic money application unit 15 through the interface unit 11.

A terminal communication unit 16, a value processing unit 17, an electronic money storage unit 18, and the like are formed in the IC chip 12 by the CPU executing within the IC chip an electronic money program stored in the EEPROM, similar to the electronic money card 6. These functions are similar to those of the electronic money card 6 shown in FIG. 3.

The value processing unit 17 communicates with the user terminal 4 via the terminal communication unit 16, and it can not only output the electronic money functional unit ID and perform the money amount changing processing similar to the electronic money card 6, but also receive the money amount changing information from the electronic money server 2 via the electronic money application unit 15 to thereby perform the money amount changing processing.

As described above, since the mobile phone can communicate with the electronic money server 2 through the electronic money application unit 15, it can connect the mobile phone to the electronic money server 2 via the electronic money application unit 15, and can charge the amount of money to be paid to the IC chip 12.

In addition, connecting the mobile phone to the advertisement server 3 makes it possible to view the advertisement moving image with the mobile phone.

Further, connecting the mobile phone to the reader/writer 5 makes it possible to use the mobile phone similarly to the electronic money card 6.

Figure 5:
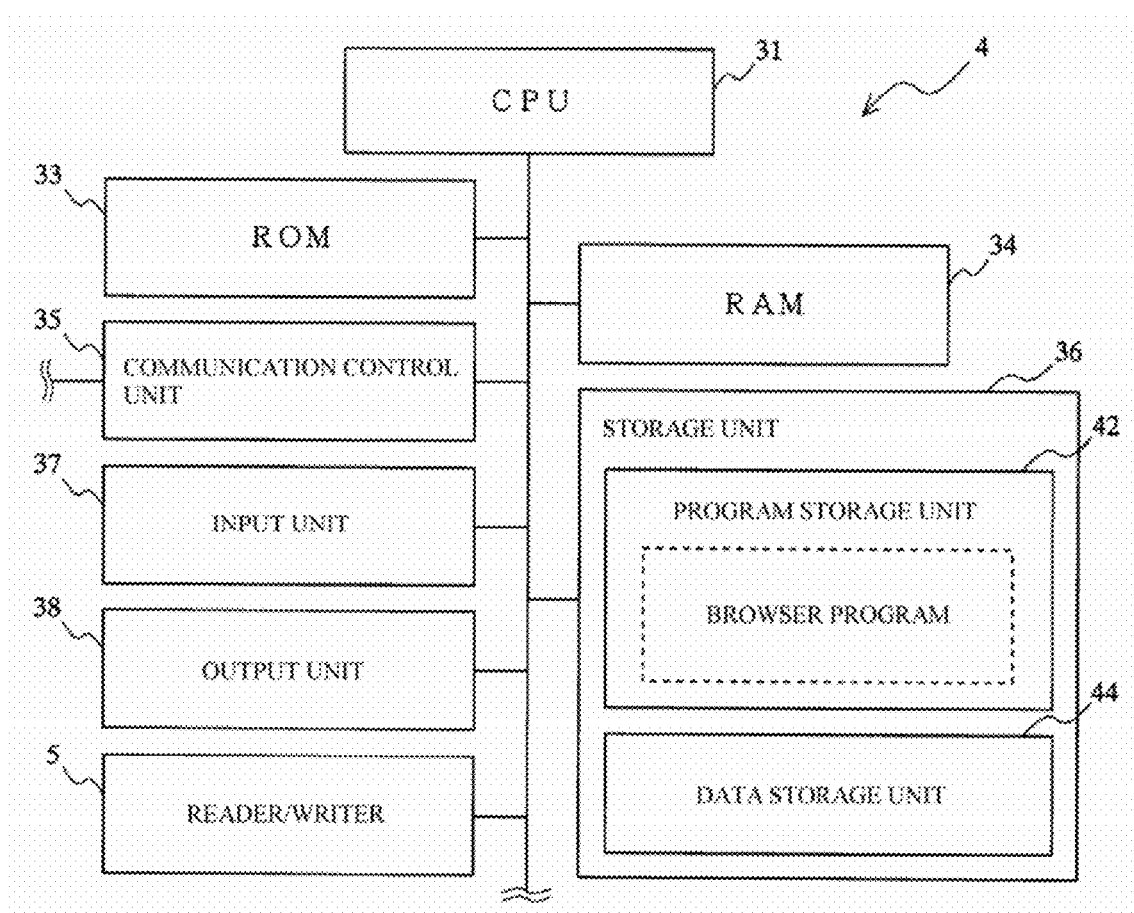
FIG. 5 is a view illustrating one example of a hardware configuration of a user terminal.

FIG. 5 is a view illustrating one example of a hardware configuration of the user terminal 4.

The user terminal 4 is constituted by a CPU 31, a ROM 33, a RAM 34, a communication control unit 35, a storage unit 36, an input unit 37, an output unit 38, the reader/writer 5, and the like, in which they are connected to each other through bus lines.

The CPU 31 processes information according to a given program, and also performs control of the whole user terminal 4 and the like.

In the present embodiment, the CPU 31 executes the browser program to form the browser unit 61, so that it connect the user terminal 4 to the advertisement server 3, transmits the electronic money functional unit ID of the electronic money card 6 to the advertisement server 3, and reproduces the advertisement moving image.

The ROM 33 is a read-only memory for storing a fundamental program, parameters, and the like for operating the user terminal 4.

The RAM 34 is a randomly writable/readable memory, which provides a working memory for the CPU 31, and loads and stores therein a program and data stored in the storage unit 36.

The communication control unit 35 is an internetworking device for connecting the user terminal 4 to the advertisement server 3, the electronic money server 2, and other server devices via the network.

The input unit 37 is constituted using input devices, for example, a keyboard, a mouse, and the like, and it accepts operations when the user selects the advertisement moving image on the advertisement selecting screen, and performs the charge to the electronic money card 6.

The output unit 38 is constituted using output devices, for example, a display, a loudspeaker, a printer, and the like, and it displays a screen of the advertisement site 68, displays the advertisement moving image, and utters the voice accompanied with the advertisement moving image.

The reader/writer 5 incorporates an antenna and performs wireless communication with the IC chip of the electronic money card 6.

The storage unit 36 is constituted by, for example, a hard disk, other storage media, and a driving device for driving them, and it is constituted by a program storage unit 42 that stores various programs, a data storage unit 44 that stores data, and the like.

An OS which is a fundamental program for operating the user terminal 4, a browser program for causing the CPU 31 to achieve the browser unit 61, and the like are stored in the program storage unit 42.

Data used by the user is stored in the data storage unit 44.

Figure 6:
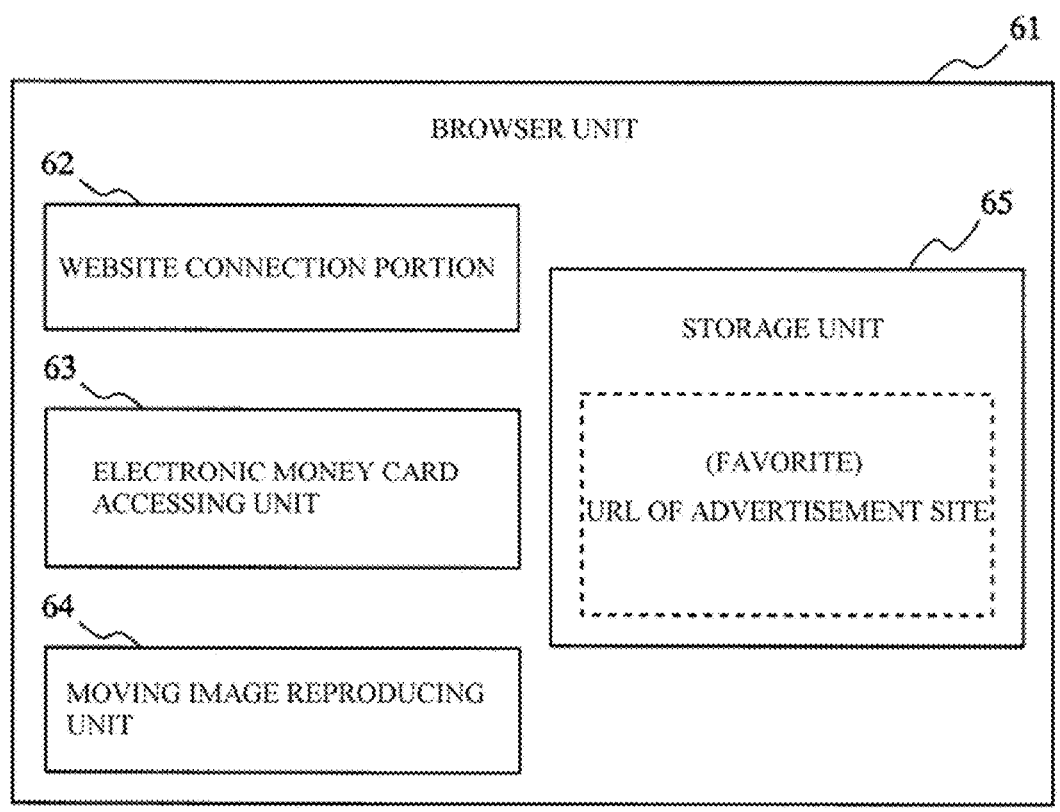
FIG. 6 is a block diagram for explaining a functional configuration of a browser unit.

FIG. 6 is a block diagram for explaining a functional configuration of a browser unit 61.

The browser unit 61 is constituted by a website connecting unit 62, an electronic money card accessing unit 63, a moving image reproducing unit 64, a storage unit 65, and the like.

These function units are formed by executing the browser program on the CPU 31 (FIG. 5).

The website connecting unit 62 is a function unit for connecting the user terminal 4 to the website on the network using the connection information (URL), and this makes it possible to browse the advertisement site 68 and the service site of the electronic money server 2, and also to visit other websites.

The electronic money card accessing unit 63 is incorporated in the browser unit 61 as, for example, an expanded function, and it is a function unit for the user terminal 4 to access the electronic money card 6.

In addition, the electronic money card accessing unit 63 also provides a communication path when the advertisement server 3 and the electronic money server 2 access the electronic money card 6.

The moving image reproducing unit 64 is a function unit for reproducing the moving image in cooperation with the moving image reproduction program, and it performs streaming reproduction of the advertisement moving image, for example.

The storage unit 65 stores the connection information of the website registered by the user as a so-called favorite, and the user can access the advertisement site 68 quickly by storing the connection information (URL) of the advertisement site 68 therein.

It is to be noted that although the user's attribute is stored in the user database of the advertisement server 3 in the present embodiment, it may be constituted so that the user's attribute is stored in the storage unit 65 and the user terminal 4 transmits it to the advertisement server 3.

Figure 7:
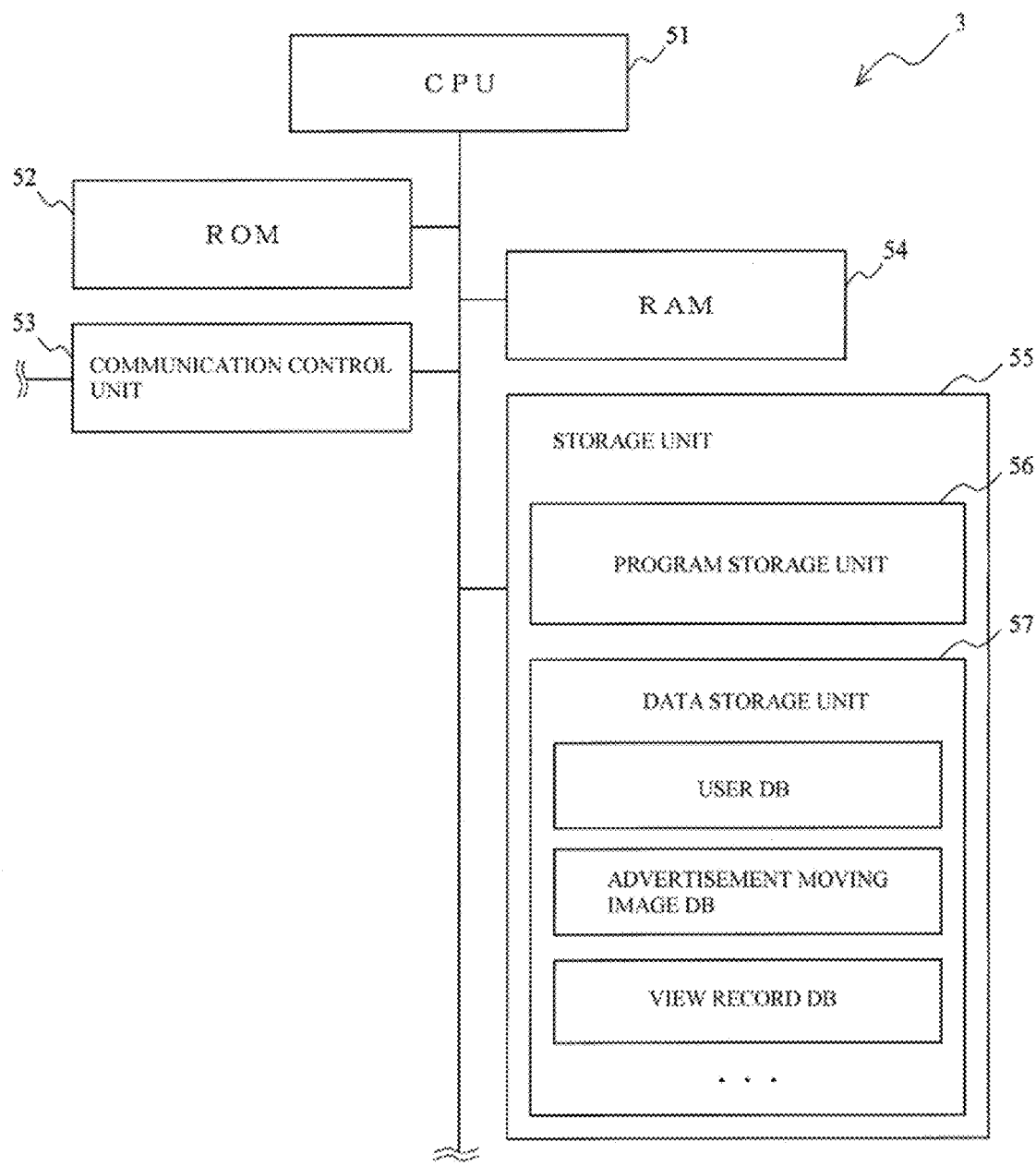
FIG. 7 is a view illustrating one example of a hardware configuration of an advertisement server.

FIG. 7 is a view illustrating one example of a hardware configuration of an advertisement server 3.

The advertisement server 3 is constituted by a CPU 51, a ROM 52, a RAM 54, a communication control unit 53, a storage unit 55, and the like, in which they are connected to each other through bus lines.

The CPU 51 is a central processing unit for performing various kinds of information processing according to a given program.

In the present embodiment, it transmits the advertisement moving image selected by the user to the user terminal 4, confirms connection between the reader/writer 5 and the electronic money card 6 during reproduction of the advertisement moving image by the user terminal 4, and generates view history data.

The ROM 52 is a read-only memory, and a fundamental program, parameters, and the like for operating the advertisement server 3 are stored therein.

The RAM 54 is a readable and writable memory, and it provides a working memory of the CPU 51, loads and stores a program and data stored in the storage unit 55, and the like.

The communication control unit 53 is a control unit for communicating with the user terminal 4, the advertiser server 7, and the like.

The storage unit 55 is constituted using, for example, a large capacity storage unit, such as a hard disk or the like, and it is constituted by a program storage unit 56 that stores various programs, a data storage unit 57 that stores data, and the like.

An OS which is a fundamental program for operating the advertisement server 3, an advertisement site program for causing the CPU 51 to achieve the advertisement site 68, and other programs are stored in the program storage unit 56.

The user database, the advertisement moving image database, the view recording database, and other databases are stored in the data storage unit 57.

Hereinafter, these databases will be described using each view in FIG. 8.

FIG. 8(a) is a view illustrating one example of a logical configuration of the user database.

The user database is composed of items, such as "electronic money functional unit ID", "name", "sex", "age", "address", "hobby", and the like, and the user's attribute (personal information) is associated with the electronic money functional unit ID.

The advertisement server 3 can specify a user by searching the electronic money functional unit ID transmitted from the user terminal 4 in the user database, and can distribute the advertisement moving image based on the user's attribute, for example, distributing an advertisement moving image for male to male users, and the like.

FIG. 8(*b*) is a view illustrating one example of a logical configuration of the advertisement moving image database.

The advertisement moving image database is composed of items, such as "advertisement ID", "moving image data", "advertiser ID", and the like, and the moving image data and the advertiser ID are associated with the advertisement ID.

The "advertisement ID" is ID information for specifying an advertising item requested by the advertiser, and this makes it possible to specify the advertisement moving image or the like to be distributed to the user.

The moving image data of the advertisement moving image is stored in the "moving image data."

When the user selects the advertisement moving image, the advertisement server 3 searches the advertisement ID of the advertisement moving image in the advertisement moving image database, and transmits the moving image data associated with this to the user terminal 4.

The "advertiser ID" is information for specifying an advertiser that has requested the distribution of the advertisement moving image.

FIG. 8(*c*) is a view illustrating one example of a logical configuration of the view recording database.

The view recording data is stored in the view recording database.

The view recording data is composed of items, such as "view ID", "electronic money functional unit ID", "advertisement ID", "view date", "view confirmation result", and the like, and the electronic money functional unit ID, the advertisement ID, the view date, the view confirmation result, and the like are associated with the view ID.

The "view ID" is ID information acquired by the advertisement server 3 whenever the user views the advertisement moving image.

The "electronic money functional unit ID" is an electronic money functional unit ID transmitted to the advertisement server 3 by the user terminal 4 when the user views the advertisement moving image.

The "advertisement ID" is an advertisement ID of the advertisement moving image viewed by the user.

The "view date" is a date when the user views the advertisement moving image.

The "view confirmation result" is a confirmation result in which the advertisement server 3 has confirmed the connection between the electronic money card 6 and the reader/writer 5 while the user terminal 4 is reproducing the advertisement moving image.

The "view confirmation result" includes three types of "all view", "partial view", and "no view." The "all view" is a case where the connection of the electronic money card 6 is able to be confirmed successively from the start to the end of the reproduction of the advertisement moving image, the "partial view" is a case where the connection of the electronic money card 6 is confirmed during a partial period from the start to the end of the reproduction of the advertisement moving image, and the "no view" is a case where the connection of the electronic money card 6 is not able to be confirmed during the reproduction of the advertisement moving image.

It is to be noted that this view confirmation result is just one example, and it may be classified in more detail, or alternatively, it may be two types of "full view" and "no view."

Although not illustrated, an advertiser database with respect to the advertiser is also stored in the data storage unit 57.

Not only connection information to the advertiser server 7, but also information with respect to the advertiser are associated with the advertiser ID which is information for specifying an advertiser and they are stored in the advertiser database.

Upon transmitting the view recording data to the advertiser server 7, the advertisement server 3 acquires the connection information to the advertiser server 7 from the advertiser database to connect to the advertiser server 7, and transmits the view recording data thereto.

Next, a procedure in which the advertisement server 3 distributes the advertisement moving image to the user terminal 4 will be described using a flowchart shown in FIG. 9.

It is to be noted that operations described in the following flowchart are performed by the CPU 21 of the electronic money card 6, the CPU 31 of the user terminal 4, and the CPU 51 of the advertisement server 3, respectively.

First, the user terminal 4 is connected to the advertisement site 68 of the advertisement server 3 through the browser unit 61, by the user's operation or the like (Step 15).

Upon accepting the connection to the advertisement site 68, the advertisement server 3 transmits advertisement selecting screen data for displaying the advertisement selecting screen to the user terminal 4 (Step 20).

The user terminal 4 receives the advertisement selecting screen data from the advertisement server 3, and displays the advertisement selecting screen on the display. When the user selects the advertisement moving image to be viewed on the advertisement selecting screen (Step 25), the user terminal 4 transmits an advertisement ID of the advertisement moving image to the advertisement server 3, and requests the view of the advertisement moving image (transmission request means).

Upon accepting a request of the view of the advertisement moving image from the user terminal 4 (transmission request receiving means), the advertisement server 3 makes the user terminal 4 display "Please set the electronic money card 6 to the reader/writer 5" or the like, and requests the user to connect the electronic money card 6 to the reader/writer 5.

When the user then connects the electronic money card 6 to the reader/writer 5 (IC chip connecting means), the advertisement server 3 establishes a communication path to the electronic money card 6 via the user terminal 4, and transmits the ID reference command to the electronic money card 6 to request transmission of the electronic money functional unit ID (Step 30).

When the electronic money card 6 receives the ID reference command from the advertisement server 3, it transmits an electronic money functional unit ID of its own to the advertisement server 3 (Step 35).

Upon receiving the advertisement ID from the user terminal 4 (ID information receiving means), the advertisement server 3 acquires (calls) the view ID, and associates the electronic money functional unit ID and the advertisement ID of the advertisement moving image selected by the user with the view ID to store them in the view recording database (storage means).

Next, the advertisement server 3 searches this advertisement ID in the advertisement moving image database to acquires the advertisement moving image (moving image data), and transmits this to the user terminal 4 (transmission means) (Step 40).

Upon receiving the advertisement moving image from the advertisement server 3 (advertisement image receiving means), the user terminal 4 reproduces this by the moving image reproduction program (reproduction means) (Step 45).

Meanwhile, upon starting the transmission of the advertisement moving image to the user terminal 4, the advertisement server 3 transmits the ID reference command to the electronic money card 6, and requests the electronic money card 6 to transmit the electronic money functional unit ID (ID information request means) (Step 55).

As described above, the user terminal 4 is provided with supporting means for supporting the advertisement server 3 to confirm that the electronic money card 6 is connected to the reader/writer 5 by providing the advertisement server 3 with the communication path to the electronic money card 6.

Upon receiving the ID reference command from the advertisement server 3, the electronic money card 6 transmits the electronic money functional unit ID to the advertisement server 3 (Step 50).

Upon receiving the electronic money functional unit ID from the electronic money card 6, the advertisement server 3 confirms that this is the same as the electronic money functional unit ID transmitted by the electronic money card 6 at Step 35 to thereby confirm that the electronic money card 6 is connected to the reader/writer 5 (connection confirming means).

The advertisement server 3 and the electronic money card 6 perform the processing of above Steps 55 and 50 at a given interval (for example, every 10 seconds, or it may be irregular) while the advertisement server 3 is transmitting the advertisement moving image (namely, while the user terminal 4 is reproducing the advertisement moving image).

As described above, the advertisement server 3 confirms that the user is viewing the advertisement moving image while locating in front of the user terminal 4, by confirming the connection between the electronic money card 6 and the reader/writer 5.

When the advertisement server 3 completes the transmission of the advertisement moving image (Step 60), the user completes the view by the user terminal 4 (Step 65).

Subsequently, the advertisement server 3 associates the view confirmation result with the view ID acquired for the view of the user (namely, association between the electronic money functional unit ID and the advertisement ID) to record them on the view recording database (Step 70).

The view confirmation result results in the "all view", the "partial view", the "no view", or the like.

While the above example assumes a viewing style in which for example, the user accesses the advertisement site 68 during visiting various websites by the browser unit 61, and if an interesting advertisement moving image is found, the user connects the electronic money card 6 to the reader/writer 5 to view it, it may be constituted so that when the electronic money card 6 is connected to the reader/writer 5, the browser unit 61 is automatically started, and thereby it connects to the advertisement site 68.

In this case, when selling a personal computer incorporating the reader/writer 5, it is particularly effective to a case where such a mechanism is incorporated, and the advertiser's advertisement moving image determined previously is desired to let the user view.

Figure 10:
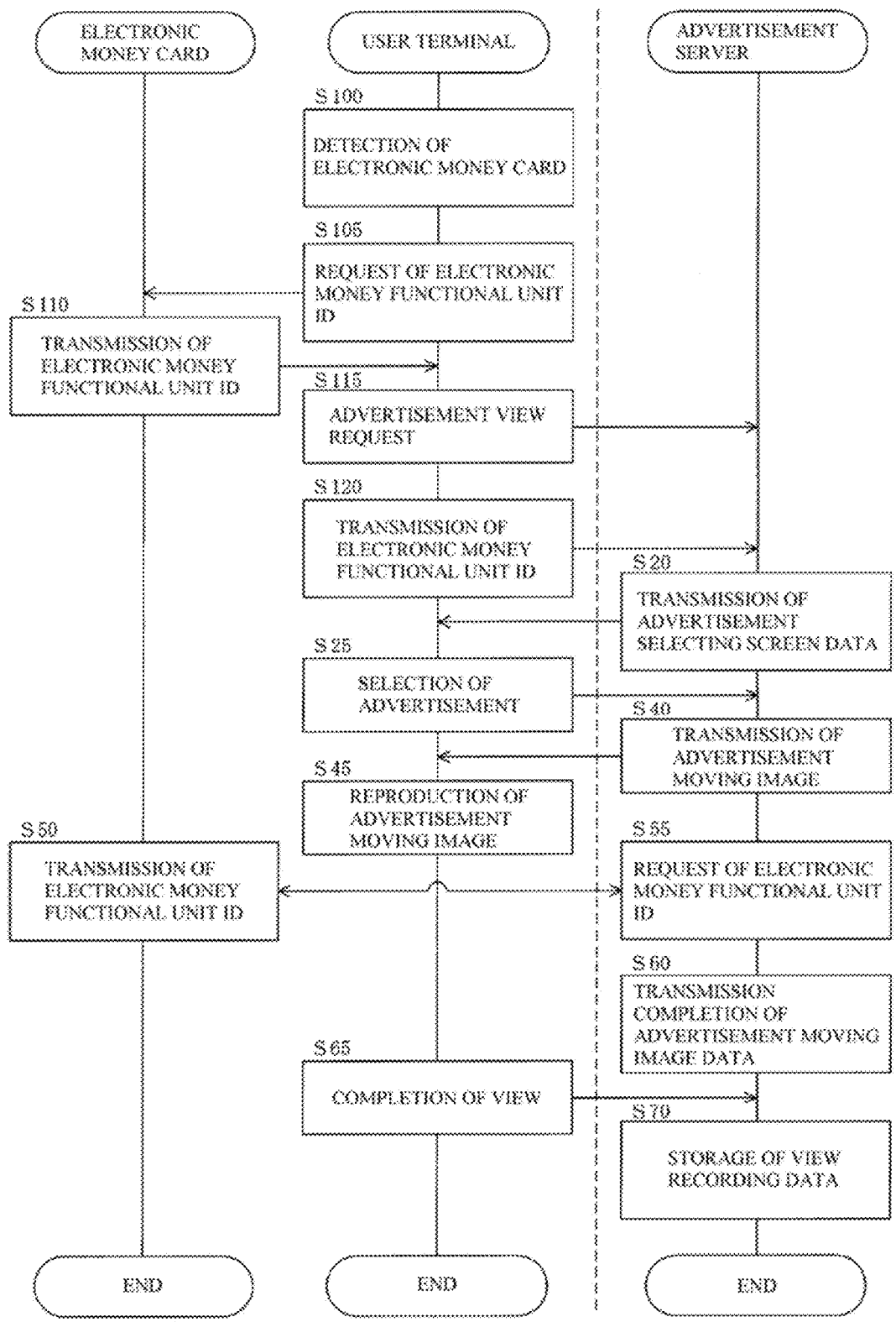
FIG. 10 is a flowchart for explaining another procedure for the advertisement server to distribute the advertisement moving image to the user terminal.

A procedure in this case will be described using a flowchart shown in FIG. 10. Incidentally, the same step number is given to the same processing as that shown in FIG. 10, and description thereof will be omitted.

First, the user terminal 4 monitors whether or not the electronic money card 6 is connected to the reader/writer 5, and when the user connects the electronic money card 6 to the reader/writer 5 (IC chip connecting means), it detects the electronic money card 6 (Step 100).

Upon detecting the electronic money card 6, the user terminal 4 transmits the ID reference command to the electronic money card 6, and requests the electronic money card 6 to transmit the electronic money functional unit ID (Step 105).

Upon receiving the ID reference command from the user terminal 4, the electronic money card 6 transmits the electronic money functional unit ID to the user terminal 4 (Step 110).

The user terminal 4 receives the electronic money functional unit ID from the electronic money card 6, and stores this in the storage unit, such as the RAM 34 (FIG. 5).

Subsequently, the user terminal 4 connects to the advertisement server 3 to request the advertisement view (Step 115), and it also transmits the electronic money functional unit ID stored in the storage unit to the advertisement server 3 (ID information transmitting means) (Step 120). As described above, the user terminal 4 has previously stored the connection information to the advertisement server 3 in this example.

Note that it may be constituted such that the user terminal 4 reads the electronic money functional unit ID from the electronic money card 6 at the step of Step 25 to transmit this to the advertisement server 3.

Figure 9:
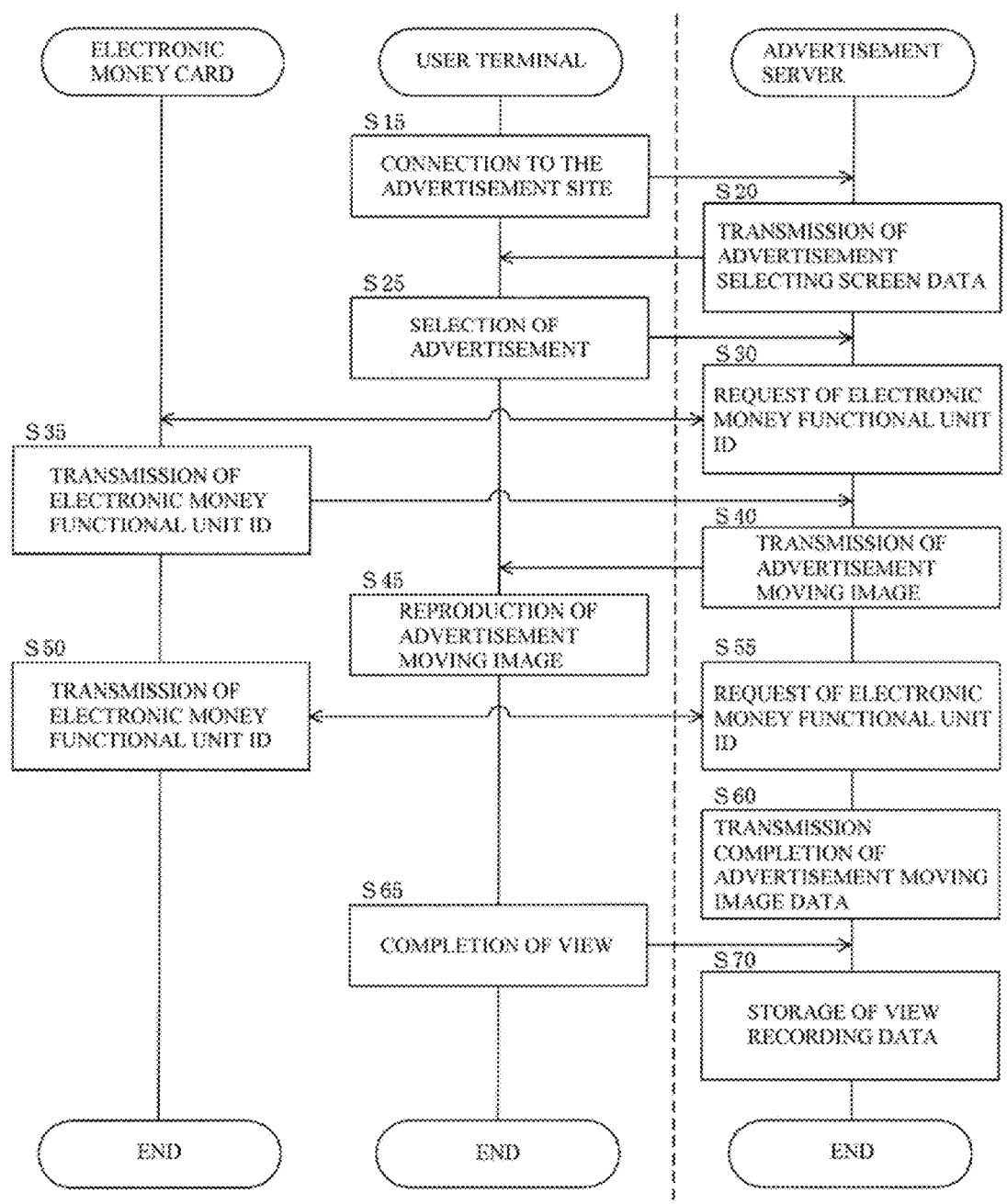
FIG. 9 is a flowchart for explaining a procedure for the advertisement server to distribute an advertisement moving image to the user terminal.

Steps after Step 20 are the same as those shown in FIG. 9 (however, except for Steps 30 and 35).

Figure 11:
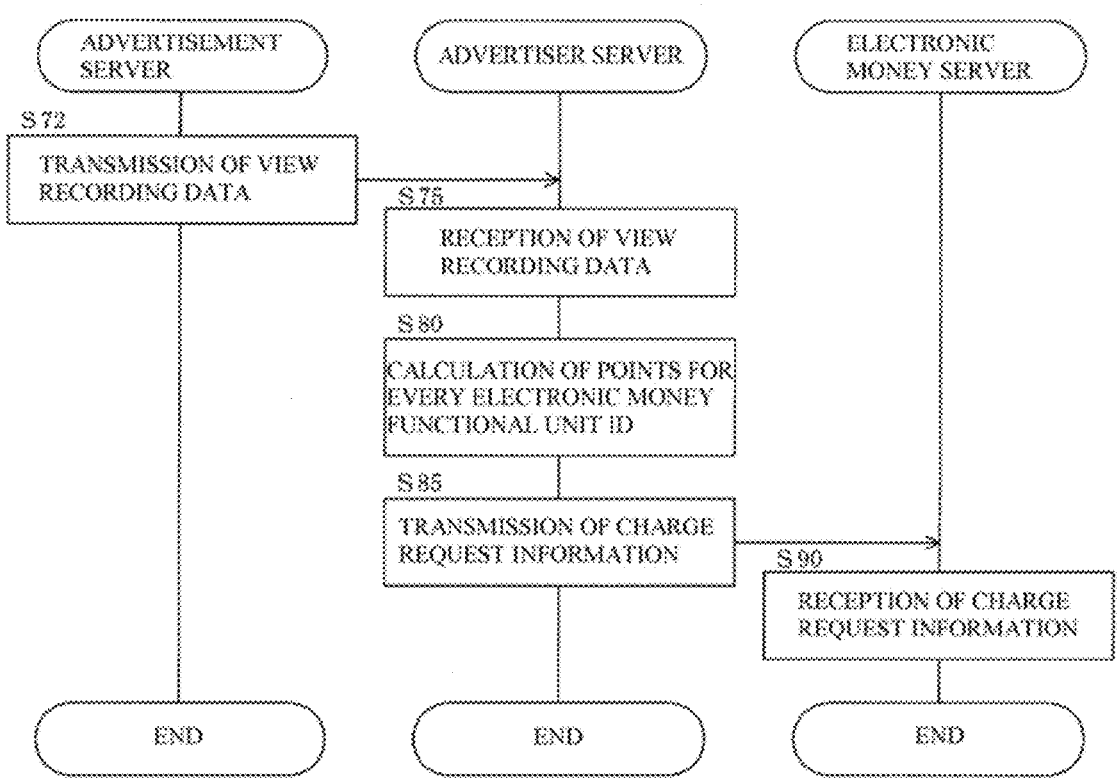
FIG. 11 is a flowchart for explaining a procedure for an advertiser server to request a charge from an electronic money server.

Next, a procedure in which the advertiser server 7 requests the charge from the electronic money server 2 will be described using a flowchart shown in FIG. 11.

First, when the view recording data is accumulated in the view recording database, the advertisement server 3 searches in the advertisement moving image database the advertisement ID recorded on the view recording data, and acquires the advertiser ID of the advertiser that has provided the advertisement moving image.

Next, the advertisement server 3 searches the connection information associated with this advertiser ID in the advertiser database, and acquires the connection information to the advertiser server 7.

Subsequently, the advertisement server 3 connects to the advertiser server 7 using this connection information, and generates the view recording data to transmit it to the advertiser server 7 (Step 72).

Upon receiving the view recording data from the advertisement server 3 (Step 75), the advertiser server 7 stores this in the view recording database.

Subsequently, the advertiser server 7 sums the stored view recording data, and calculates points for every electronic money functional unit ID to sum the points (Step 80).

This summing is performed by checking up the view confirmation result recorded on the view recording data with the payment standard.

For more details, for example, the advertiser server 7 stores the payment standard, such as 10 points with respect to the view recording data whose view confirmation result is the "all view", 1 point with respect to the view recording data whose view confirmation result is the "partial view", 0 points with respect to the view recording data whose view confirmation result is the "no view", and the like, checks up each view recording data with the payment standard, and adds the number of points for every electronic money functional unit ID.

The payment standard may be arbitrarily determined by the advertiser. In addition, association between the number of points and the amount of money paid to the user, such that 1 point is equivalent to 1 yen, or the like may be arbitrarily determined by the advertiser.

Thus, upon summing the point for every electronic money functional unit ID, the advertiser server 7 sums the amount of money to be charged from the number of points, for every electronic money functional unit ID, and generates the charge request information to transmit it to the electronic money server 2 (Step 85).

The charge request information includes the electronic money functional unit ID, the amount of money to be charged, the advertiser ID, and the like.

The electronic money server 2 receives the charge request information from the advertiser server 7 (Step 90), and stores this in the database.

In this way, after receiving the charge request information from the advertiser server 7, the electronic money server 2 charges the value requested from the advertiser server 7 to the electronic money card 6 according to the request from the user.

This processing will be performed as follows, for example.

When the user logs in to the service site oldie electronic money server 2 from the user terminal 4, the electronic money server 2 displays the amount of money of the value chargeable to the user to urge the charge.

When the user connects the electronic money card 6 to the reader/writer 5 according to this, for example, to click a charge button displayed on the display of the user terminal 4, the electronic money server 2 confirms the electronic money functional unit ID of the electronic money card 6 to then transmit to the electronic money card 6 the money amount changing information which charges the value for the amount of money to be paid. The electronic money card 6 receives this money amount changing information, and performs the charge. As described above, the user can obtain the reward resulting from the advertisement view with electronic money.

Different server devices are used as the advertisement server 3, the advertiser server 7, and the electronic money server 2 in the present embodiment described above, but not limited to this, a server device in which the advertisement server 3 and the advertiser server 7, the advertisement server 3 and the electronic money server 2, the advertiser server 7 and the electronic money server 2, and the advertisement server 3, the advertiser server 7, and the electronic money server 2 are combined may be used.

Particularly, when an electronic money business enterprise and an advertising business enterprise are the same, the advertisement server 3 and the electronic money server 2 may be combined, and the chargeable amount of money of the value and the buttons for the charge may be displayed on the advertisement selecting screen.

It is possible to obtain following effects according to the present embodiment described above and modified embodiments.

(1) The advertiser can give the user detailed description of the product by the advertisement moving image.

(2) It is possible to confirm that the user is viewing the advertisement moving image by confirming the connection between the electronic money card 6 and the reader/writer 5.

(3) The user can receive the reward by viewing the advertisement moving image.

(4) Since the view of the advertisement moving image and the receipt of the reward are performed by the electronic money card 6, the user can view the advertisement moving image and receive the reward easily.

(5) It is possible to distribute the advertisement moving image suitable for the use by associating the electronic money card 6 and the user's attribute with the user database.

Modified Embodiment 1

Although the advertisement server 3 monitors the connection between the electronic money card 6 and the reader/writer 5 during the reproduction of the advertisement moving image by the user terminal 4 in the above example, it may be configured such that the user terminal 4 monitors the connection between the electronic money card 6 and the reader/writer 5 (monitor means), and transmits the view confirmation result to the advertisement server 3 after completing the reproduction of the advertisement moving image.

In this example, the user terminal 4 first transmits the ID reference command to the electronic money card 6, and acquires the electronic money functional unit ID from the electronic money card 6 to store it therein when the electronic money card 6 is connected to the reader/writer 5.

Subsequently, when the reproduction of the advertisement moving image is started, the user terminal 4 transmits the ID reference command to the electronic money card 6 at a given interval (or irregularly) to acquire the electronic money functional unit ID from the electronic money card 6, and by confirming that this is the same electronic money functional unit ID as that stored previously, it is determined that the electronic money card 6 is connected to the reader/writer 5.

The user terminal 4 continues this operation till the end of the reproduction of the advertisement moving image, and transmits to the advertisement server 3 the view confirmation result that it is the "all view" when the electronic money card 6 is connected till the end of the reproduction of the advertisement moving image, it is the "partial view" when connected during a partial period, it is the "no view" when not connected at all, and the like. Thereby, the user terminal 4 supports the advertisement server 3 to confirm that the electronic money card 6 is connected to the reader/writer 5.

The advertisement server 3 receives the view confirmation result from the user terminal 4, and associates it with the view ID to store them in the view recording database.

Modified Embodiment 2

In this example, a connection instruction that "Please set the electronic money card to the reader/writer" and a disconnection instruction that "Please remove the electronic money card from the reader/writer" are made to the user, upon the start of the reproduction of the advertisement moving image, during the reproduction, upon the end of reproduction, and the like (instruction means), and the user connects or disconnects the card according to this.

These instructions and confirmations of the connection and the disconnection may be made by the advertisement server 3 or by the user terminal 4.

For example, when the advertisement server 3 makes the instructions, the advertisement server 3 confirms whether the electronic money card 6 is connected or disconnected as instructed during a given time after issuing the instructions of the connection and the disconnection (for example, for 10 seconds), by transmitting the ID reference command (connection/release confirming means).

Subsequently, when the connection and the disconnection are made according to all the instructions, the advertisement server 3 determines that the view confirmation result is the "all view"; when the connection and the disconnection are made according to a part of the instructions, it determines that the view confirmation result is the "partial view"; and when the connection and the disconnection are not made according to the instructions at all, it determines that the view confirmation result is the "no view." A case where the user terminal 4 makes the instructions is also similar to that.

It is to be noted that the access to the electronic money card 6 may be performed at irregular intervals. In this case, it may be configured so as to have given regularity, such that the access interval is reduced as the distribution of the advertisement moving image approaches the end.

As described above, giving the operation instructions to the user to then confirm that the user detaches and attaches the electronic money card 6 as the instructions makes it possible to confirm that the user exists in front of the user terminal 4, and is watching the display, thus allowing a view state of the user to be obtained more reliably.

Modified Embodiment 3

According to the present modified embodiment, the advertisement server 3 sends questionnaires and quizzes after the reproduction of the advertisement moving image, and the view state of the user is grasped based on the answered results.

This may be combined with the connection confirmation between the electronic money card 6 and the reader/writer 5 according to the previous embodiment, or alternatively, without performing the connection confirmation between the electronic money card 6 and the reader/writer 5, the "all view", the "partial view", and the "no view" may be determined based on the answers to the questionnaires and the quizzes.

As contents of the questionnaires, it is more effective to provide contents which can obtain information valuable to the advertiser from the user, such that "Do you own a car currently?", "Are you considering to buy a new car?", and the like, for the advertisement moving image of cars, for example.

Meanwhile, as contents of the quizzes, it is possible to further increase advertising effectiveness by providing contents which further impress product's effects on the user, such that "Please select the effect of OO hot spring from next items; 1: Promotion of metabolism, 2: Smooth skin, 3: Stabilization of blood pressure, 4: All of 1 to 3", for the advertisement moving image of hot springs, for example.

In addition, a quiz for testing how much attentiveness the user has paid on which advertisement moving image, such that "What color the background of the screen was?", and the like, while changing the background color of the advertisement moving image, is also possible.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An advertisement server for transmitting an advertisement image to a user terminal connectable to an IC chip to which ID information is given, the advertisement server comprising:
a communication unit;
a storage unit;
at least one processor; and
a memory device storing instructions which when executed by the at least one processor, cause the at least one processor to:
accept a transmission request of the advertisement image from the user terminal;
receive, from the user terminal, ID information of an IC chip connected to the user terminal;
transmit to the user terminal an advertisement image whose transmission request is accepted;
obtain a view confirmation result indicating how much of the transmitted advertisement image was viewed by confirming a connection between the IC chip and the user terminal while the user terminal reproduces the advertisement image;
generate view recording data including an association between the ID information of the IC chip, the view confirmation result, and the transmitted advertisement image; and
transmit the view recording data to a reward server to calculate a reward for a user of the IC chip based on the view recording data.

2. The advertisement server according to claim 1, wherein the instructions further cause the at least one processor to:
confirm that the IC chip is connected to the user terminal during reproduction of the advertisement image at the user terminal.

3. The advertisement server according to claim 2, wherein the instructions further cause the at least one processor to:
request the ID information of the IC chip via the user terminal;
request transmission of the ID information of the IC chip while the user terminal is reproducing the advertisement image; and
confirm that the IC chip transmits a same ID information as the received ID information in response to the request to thereby confirm that the IC chip is connected to the user terminal.

4. The advertisement server according to claim 2, wherein the user terminal is configured to monitor that the IC chip is connected thereto during reproducing the advertisement image, and
the instructions further cause the at least one processor to:
confirm that the IC chip is connected to the user terminal during the reproduction of the advertisement image by receiving from the user terminal a monitored result.

5. The advertisement server according to claim 1, wherein the instructions further cause the at least one processor to:
give to a user a connection instruction to connect the IC chip to the user terminal, and a release instruction to release the connection;
confirm that the IC chip is connected and released in response to the connection instruction and the release instruction.

6. An advertisement method performed by an advertisement server that transmits an advertisement image to a user terminal connectable to an IC chip to which ID information is given, the advertisement method comprising:
accepting, by the advertisement server, a transmission request of the advertisement image from the user terminal;
receiving, by the advertisement server, from the user terminal ID information of an IC chip connected to the user terminal;
transmitting, by the advertisement server, to the user terminal an advertisement image whose transmission request is accepted;

obtaining, by the advertisement server, a view confirmation result indicating how much of the transmitted advertisement image was viewed by confirming a connection between the IC chip and the user terminal while the user terminal reproduces the advertisement image;

generating, by the advertisement server, view recording data including an association between the ID information of the IC chip, the view confirmation result, and the transmitted advertisement image; and transmitting, by the advertisement server, the view recording data to a reward server to calculate a reward for a user of the IC chip based on the view recording data.

7. The advertisement server according to claim 1, wherein the advertisement server and the reward server are a same server.

* * * * *